(12) United States Patent
Morse

(10) Patent No.: US 8,688,026 B2
(45) Date of Patent: Apr. 1, 2014

(54) ESSAY WRITING SYSTEM

(76) Inventor: Barry Morse, Hallandale, FL (US)

( * ) Notice: Subject to any disclaimer, the term of this patent is extended or adjusted under 35 U.S.C. 154(b) by 1274 days.

(21) Appl. No.: 11/972,005

(22) Filed: Jan. 10, 2008

(65) Prior Publication Data

US 2008/0178084 A1 Jul. 24, 2008

Related U.S. Application Data

(60) Provisional application No. 60/881,291, filed on Jan. 19, 2007.

(51) Int. Cl.
*G09B 7/00* (2006.01)

(52) U.S. Cl.
USPC ............ 434/353; 434/322; 434/323; 434/350

(58) Field of Classification Search
USPC ................... 434/167, 353, 322, 323; 704/257
See application file for complete search history.

(56) References Cited

U.S. PATENT DOCUMENTS

| | | | | |
|---|---|---|---|---|
| 2,728,997 | A * | 1/1956 | Gross | 434/167 |
| 4,445,869 | A * | 5/1984 | Wasserman | 434/156 |
| 5,100,154 | A * | 3/1992 | Mullins | 273/429 |
| 5,102,338 | A | 4/1992 | Kapiloff | |
| 5,478,120 | A | 12/1995 | D'Andrea | |
| 5,493,606 | A * | 2/1996 | Osder et al. | 379/88.05 |
| 5,660,548 | A * | 8/1997 | Ellenbogen | 434/167 |
| 5,721,845 | A | 2/1998 | James et al. | |
| 5,732,221 | A | 3/1998 | Feldon et al. | |
| 5,772,446 | A * | 6/1998 | Rosen | 434/307 R |
| 5,832,504 | A | 11/1998 | Tripathi et al. | |
| 5,897,646 | A * | 4/1999 | Suda et al. | 715/222 |
| 6,254,395 | B1 * | 7/2001 | Breland et al. | 434/156 |
| 6,361,322 | B1 * | 3/2002 | Linden Henry | 434/178 |
| 6,859,211 | B2 | 2/2005 | Friedlander | |
| 6,934,905 | B1 | 8/2005 | Tighe | |
| 7,104,798 | B2 * | 9/2006 | Spaventa | 434/156 |
| 7,120,622 | B2 | 10/2006 | Zellweger et al. | |
| 7,127,208 | B2 * | 10/2006 | Burstein et al. | 434/353 |
| 7,694,222 | B2 * | 4/2010 | Steen et al. | 715/255 |
| 2001/0031458 | A1 * | 10/2001 | Schramm | 434/350 |
| 2002/0124048 | A1 | 9/2002 | Zhou | |
| 2002/0194186 | A1 | 12/2002 | Ode | |
| 2003/0046264 | A1 | 3/2003 | Kauffman | |
| 2003/0048308 | A1 | 3/2003 | Friedlander | |
| 2003/0115170 | A1 | 6/2003 | Turner et al. | |
| 2004/0221233 | A1 | 11/2004 | Thielen | |
| 2004/0250209 | A1 * | 12/2004 | Norcross et al. | 715/700 |
| 2005/0084830 | A1 * | 4/2005 | Kaufmann | 434/169 |
| 2005/0188322 | A1 * | 8/2005 | Napoleon | 715/760 |
| 2005/0202386 | A1 | 9/2005 | Clements | |
| 2006/0123329 | A1 * | 6/2006 | Steen et al. | 715/500 |

(Continued)

OTHER PUBLICATIONS

Klein, Sneldon. "Automatic Paraphrasing in Essay Format". Indiana University. Jul. 29-30, 1964.*

(Continued)

*Primary Examiner* — Robert J Utama
(74) *Attorney, Agent, or Firm* — David W. Barman

(57) ABSTRACT

A computer based system for composing an essay comprising at least one computer-readable medium having one or more executable instructions stored thereon, which when executed by at least one processing system, causes the at least one processing system to implement one or more essay generation tools for assisting a user in generating at least one essay.

5 Claims, 4 Drawing Sheets

(56) References Cited

U.S. PATENT DOCUMENTS

| | | | |
|---|---|---|---|
| 2006/0173731 A1 | 8/2006 | Scarpelli | |
| 2006/0212810 A1 | 9/2006 | Segal et al. | |
| 2006/0248086 A1 | 11/2006 | Pahud | |
| 2007/0105079 A1* | 5/2007 | O'Toole et al. | 434/236 |
| 2007/0238084 A1* | 10/2007 | Maguire et al. | 434/353 |
| 2008/0312927 A1* | 12/2008 | Constantin | 704/251 |

OTHER PUBLICATIONS

Bulhal, Andrew C. "On the Simulation of Postmodernism and Mental Debility using Recursive Transition Networks." Department of Computer Science, Monash University. Apr. 1, 1996.*

Story for Kids http://www.story4kids.com.

Instant Story Creator http://kidscanwrite.com.

Create a Silly Story http://www.world-english.org/instantstory.htm.

Instant Essay Creator Software http://www.writer-on-line.com/content/view352/66/Articles/Reviews/Instant-EssayCreator-Software-by-Kristi-Sayles.html.

IntelliVIEW: http://www.synaptris.com/cmpgn/reporting/report-writer/reprot-writer.html?Redir=ga usc rw&WT.mc id=ga usc rw&WT.srch=1.

HelpDisk! 2.6 essay-writing program http://www.mantex.co.uk.software/helpdisk.htm.

\* cited by examiner

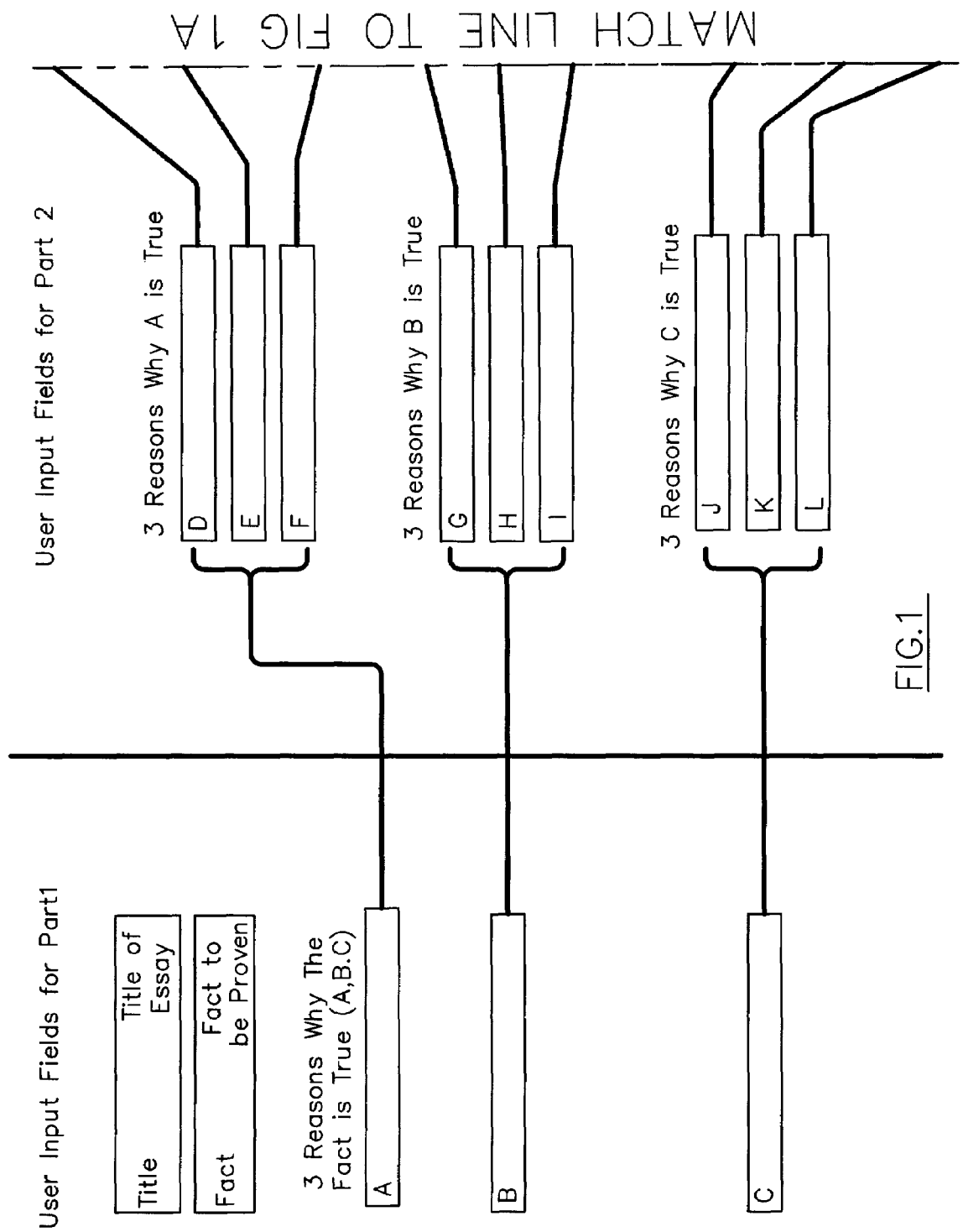

Auto-Generated Complete Outline
Title

I) Fact
   A) A
   B) B
   C) C
   D) Therefore, Fact

II) Fact Because A
   A) D
      a) D1
      b) D2
      c) D3
   B)
      a) E1
      b) E2
      c) E3
   C)
      a) F1
      b) F2
      b) F3
   D) Therefore, Fact because A III) Fact Because B
   A)
      a) G1
      b) G2
      c) G3
   B)
      a) H1
      b) H2
      c) H3
   C)
      a) I1
      b) I2
      c) I3
   D) Therefore, Fact because B IV) Fact Because C
   A)
      a) J1
      b) J2
      c) J3
   B)
      a) K1
      b) K2
      c) K3
   C)
      a) L1
      b) L2
      c) L3
   D) Therefore Fact Because C V) So Fact
   A) A
   B) B
   C) C
   D) Therefore Fact

FIG. 2

Auto— Generated Complete Composition

Vary Your Restatements and Rewrite
---
Title

Fact Because A.B.C. Therefore,Fact

Fact Because A.D...Therefore, Fact Because A
Fact because D. because D1.because D2.becauseD3,
 Therefore, Fact because D
Fact because. because E1.because E2.because E3.
 Therefore, Fact because
Fact because.because F1.because F2.because F3.,
 Therefore,Fact because
So Fact because A.D...Therefore,Fact because A Fact because B....Therefore,Fact because B
Fact because G1.because G2.because G3.Therefore,Fact because
Fact because.because H1.because H2.because H3.Therefore,Fact because
Fact because. because I1.because I2.because I3.Therefore,Fact because
So Fact because B...Therefore,Fact because B
C...Therefore, Fact because C
Fact because.because J1.because J2.because J3.Therefore, Fact because
Fact because.because K1.because K2.because K3.Therefore,Fact because
Fact because.because L1.because L2.because L3.Therefore,Fact because
So Fact because C.D...Therefore,Fact because C
So Fact.A.B.C.Therefore,Fact

FIG.2A

ESSAY WRITING SYSTEM

INDEX TO RELATED APPLICATIONS

This application claims the benefit of U.S. Provisional Patent Application Ser. No. 60/881,291 filed Jan. 19, 2007 the disclosure of which is incorporated herein by reference in its entirety.

BACKGROUND OF THE INVENTION

For many years, educators have struggled with the arduous task of teaching writing skills to students. One of the most difficult areas to teach, is the writing of expository essays. Numerous attempts at providing computer assisted essay instruction have had mixed and limited success. Often, the methods and their lack of success discourage students from acquiring this very important skill. The present invention has a dressed the shortcomings of previous attempts and provides a novel, innovation, and even effective system for teaching expository writing.

BRIEF SUMMARY OF THE INVENTION

An essay should have a simple form used for the expression of an idea or the proof of a point. Unfortunately, until now, all the rules were too nebulous to allow the writer the freedom found in standardized form. For example, we were told that a paragraph changed when the idea changed. What if the idea of my essay was my life story? Should this then make my essay one long paragraph?

Therefore, we have developed an organized form that gives the writer the framework within which to express his or her ideas. This method shows when to start each paragraph, what goes into each paragraph, how to end the paragraph, and the order of the paragraphs. By following the form, the inclusion of extraneous material is prevented and as an eventual side benefit teaches the writer to think in a more logical manner. Yet, in spite of all the attention to form, it allows the writer the freedom to express him or herself with all the creativity in the world.

With the use of this writing style, the writer can spend his or her time on the formulation of ideas, not the formation of form.

In one embodiment, the present invention is a computer based system for composing an essay comprising:
  (a) at least one computer-readable medium having one or more executable instructions stored thereon, which when executed by at least one processing system, causes the at least one processing system to implement one or more essay generation tools for assisting a user in generating at least one essay;
  (b) said one or more stored executable instructions comprising a primary instruction prompt to provide a thesis statement;
  (c) said one or more stored executable instructions further comprising prompts for a secondary instruction to provide at least one paragraph topic sentence wherein said instruction for said paragraph topic sentence contains instruction as to being related to proving said thesis statement;
  (d) said one or more stored executable instructions further comprising prompts for a conclusory instruction to provide at least one conclusion paragraph topic sentence wherein said instruction for said conclusion paragraph topic sentence contains instruction as to restating said thesis statement and said proofs.

The system computer readable medium may be stored on a remote database and may be accessed through the Internet.

The system has an output based on the thesis statements, topic sentence, and conclusion paragraph topic sentence.

The system also has a user viewable display with at least two distinct regions for displaying user provided input and essay output on a single display.

Also contemplated is a method for composing an expository essay comprising the steps of:
  a. at least one computer-readable medium having one or more executable instructions stored thereon, which when executed by at least one processing system, causes the at least one processing system to implement one or more essay generation tools for assisting a user in generating at least one essay;
  b. said one or more stored executable instructions comprising a primary instruction prompt to provide a thesis statement;
  c. said one or more stored executable instructions further comprising prompts for a secondary instruction to provide at least one paragraph topic sentence wherein said instruction for said paragraph topic sentence contains instruction as to being related to proving said thesis statement;
  d. said one or more stored executable instructions further comprising prompts for a conclusory instruction to provide at least one conclusion paragraph topic sentence wherein said instruction for said conclusion paragraph topic sentence contains instruction as to restating said thesis statement and said proofs.

Additionally contemplated as an aspect of the invention is an Essay produced by the system disclosed system and method.

In one embodiment, the Essay may have an option for an age appropriate output.

The Basic Paragraph

A paragraph is an organized expression of a complete idea. It begins with a topic sentence. The topic sentence informs the reader as to exactly what will be discussed in the paragraph. It limits the range of the subjects. The next part or body of the paragraph proves or clarifies the topic sentence. Only statements that directly refer to the topic sentence are used in this section. The end of the paragraph is the clincher sentence. The clincher sentence is the conclusion and may restate the topic sentence as proven. All paragraphs must have a beginning, a middle and an end in the form of a topic sentence, body of proof, and a clincher sentence.

The Short Essay

To write a short essay, one simply expands the basic paragraph. This paper begins with a thesis statement. It is similar to the topic sentence in that it begins the first paragraph and all following information must be, in some way, relate to it. A thesis statement is a statement of fact. A fact is something that can be discussed. If it can't be discussed, you can't write about it. The thesis statement is followed by major proofs. These are used to prove or clarify the thesis statement. Then, as always, a clincher sentence is used as a conclusion for the paragraph and restating the thesis.

The next section of the essay is the body. It is similar to the body of a simple paragraph, except that it is a group of paragraphs. Combining the thesis statement with each of the major proofs forms the topic sentence of each paragraph. (A separate topic sentence and paragraph is needed for each major proof.) Following the topic sentence, in each case, are minor proofs whose purpose is to directly prove the topic sentence and indirectly prove the thesis statement. Each paragraph in the body is ended with a clincher sentence.

The paper is ended with a paragraph of conclusion. This paragraph begins with a restatement of the thesis statement and also restates the major proofs. Any conclusions that the writer has conceived are included in this paragraph. This paragraph, as with all others in this style of writing, ends with a clincher statement. In this case, the clincher restates the thesis as proven.

The Five-Paragraph Essay (in Five Paragraph Essay Form)

The five-paragraph essay is the most organized way to elaborate on any expository theme. It begins with a paragraph of introduction. It follows with three paragraphs of proofs. The essay concludes with a paragraph of conclusion. Using this device the modern writer can easily analyze, in an organized fashion, any subject he or she desires.

The five-paragraph essay begins with a paragraph of introduction. This starts with a thesis statement. A thesis statement is a statement of fact (a fact being anything which can be discussed). This is followed by three major proofs that directly assert the validity of the thesis statement. The paragraph concludes with a clincher statement, that is, one that restates the thesis as proven. All essays of this style must begin with a paragraph of introduction.

The main body of this expository style of writing contains the thesis statement combined with the major proofs. The first major proof is combined with the thesis statement to form the topic sentence of the second paragraph. Three minor proofs are used to validate this topic sentence. Again, as in all proof style paragraphs, it ends with a clincher statement. The same process is used for the other major proofs.

The final part of the essay is, logically the conclusion. This is essentially a restatement of the introductory paragraph as proven. It must contain the thesis statement, major proofs, and a clincher statement. This paragraph completes the essay.

With this tool for writing expository essays today's author can logically analyze any subject. With the use of a paragraph of introduction, a body of proof, and a conclusion he can discuss knowledgeably almost any subject of which he has the necessary information.

Comparison/Contrast Essay

In a comparison or contrast essay it is most important to remember that for every point the counterpoint must be stated or there is no valid comparison. Simply state as major proofs in the paragraph of introduction both sides of the issue. Then in each paragraph of the body of the essay present a direct comparison of all aspects of the subject.

The Longer Essay

The expansion of a five-paragraph essay form into a longer essay is a simple matter. Write a basic thesis statement with three basic proofs and clincher sentence. Then form a five-paragraph essay using the basic thesis and the first basic proof of your thesis for the first section. Repeat the process for two more five-paragraph sections. End with a paragraph of conclusion that restates the opening paragraph of the essay. Remember to use transitions to tie all the parts together.

As you will see in the following outline, the longer paper can be viewed in a simplified manner, as follows:

Paragraph I—Introduction
II-VI A five-paragraph essay based on the basic thesis and the first basic proof.
VII-XI A five-paragraph essay based on the basic thesis and the second basic proof.
XII-XVI A five-paragraph essay based on the basic thesis and the third basic proof.
XVII Conclusion Or put another way, the process is as follows: p=paragraph
5 p essay to longer essay
p2 stays p2 and is repeated as p6 (conclusion) and builds all topic sent. and clincher sent.
p3 of short essay becomes p7 and p11 (concl) of longer and builds topic sent. and clincher sent,
p4 of short essay becomes p12 and p16 (concl) of longer and builds topic sent. and clincher sent.
p5 of short essay is repeated as p17 (p1 as proven)

Remember, these outlines are only a basic guide. Fit them to your subject's needs.

Longer Essay Outline
INTRODUCTION
I. Basic thesis statement
  A. }
  B. } Basic proofs
  C. }
  D. Clincher sentence
BODY
II. Thesis statement 1 (Basic thesis plus basic proof I-A)
  A. }
  B. } Major proofs 1
  C. }
  D. Clincher sentence
III. Topic sentence (Thesis 1, plus major proof II-A)
  A. }
  B. } Minor proofs
  C. }
  D. Clincher sentence
IV. Topic sentence (Thesis 1 plus major proof II-B)
  A. }
  B. } Minor proofs
  C. }
  D. Clincher sentence
V. Topic sentence (Thesis 1 plus major proof II-C)
  A. }
  B. } Minor proofs
  C. }
  D. Clincher sentence
VI. Topic sentence Thesis 1 as proven
  A. }
  B. } Major proofs 1
  C. }
  D. Clincher sentence-restate Thesis 1 as proven
VII. Thesis statement 2 (Basic thesis plus basic proof B)
  A. }
  B. } Major proofs 2
  C. }
  Clincher sentence
VIII. Topic sentence (Thesis 2 plus major proof VII-A)
  A. }
  B. } Minor proofs
  C. }
  D. Clincher sentence
IX. Topic sentence (Thesis 2 plus major proof VII-B)
  E. }
  F. } Minor proofs
  G.
  H. Clincher sentence
X. Topic sentence (Thesis 2 plus major proof VII-C)
  I. }
  J. } Minor proofs
  K. }
  L. Clincher sentence
XI. Topic sentence (restatement of Thesis 2)
  A. }
  B. } Major proofs 2
  C.
  D. Clincher sentence-restate Thesis 2 as proven
XII. Thesis statement 3 (Basic thesis plus basic proof C)
  A. }
  B. }Major proofs 3

C. }
D. Clincher sentence
XIII. Topic sentence (Thesis 3 plus major proof XII-A)
A. }
B. } Minor proofs
C. }
D. Clincher sentence
XIV. Topic sentence (Thesis 3 plus major proof XII-B)
A. }
B. } Minor proofs
C. }
D. Clincher sentence
XV. Topic sentence (Thesis 3 plus major proof XII-C)
A. }
B. } Minor proofs
C. }
D. Clincher sentence
XVI. Topic sentence (restatement of Thesis 3)
A. }
B. } Major proofs 3
C. }
D. Clincher sentence restate Thesis 3 as proven
ESSAY CONCLUSION
XVII. Restate Basic Thesis
A. }
B. } Basic proofs
C. }
D. Clincher sentence—Basic Thesis as proven.

The present invention is unique in that it automatically generates statements and paragraphs based on minimal user input and does not allow the user to digress from the original assertion. We ask for the user to state a fact (defined here as a fact being something which can be discussed). We then ask for three reasons why that fact is true. Every time a blank(s) is seen on the screen there is a question above it to keep the user on track. The user clicks on the "save and expand" button and he is automatically given a five paragraph worksheet. In the worksheet many things have been automatically done for him. The program has repeated the thesis (original fact) in the first paragraph and added it as the clincher sentence with the word "therefore" added to the beginning of the clincher statement. It has also repeated his facts in the body of the first paragraph. The program combines the thesis statement with the first proof, connected by the word because, to form the topic sentence of the second paragraph and left three blanks for the user to fill in (facts which prove the topic sentence) and created a clincher statement beginning with the word "therefore" and repeating the topic sentence as therefore proven. The program similarly does this with the second and third facts forming, respectively, the third and fourth paragraphs. The fifth or paragraph of conclusion repeats the first paragraph as proven by beginning it with the word "so."

The thesis statement and the supporting facts are color coded.

The program further expands into a seventeen paragraph paper which is basically three five paragraph essays plus the original paragraphs of introduction and conclusion.

For research capabilities, the initial thesis is linked to Google®.

The "view essay as" component allows the user to view his paper, in various lengths, in either an outline or paragraph form. It also allows the user to split the screen so that the rough form is on the left side and he can vary the restatements and polish the essay on the right side of the screen.

BRIEF DESCRIPTION OF THE DRAWINGS

FIG. 1 is a flow chart of the system.
FIG. 2 are annotations relating to the flow chart of FIG. 1.
FIG. 2A are annotations relating to the flow charts of FIGS. 1 and 1A.

DETAILED DESCRIPTION OF THE PREFERRED EMBODIMENTS

Figure 1A:
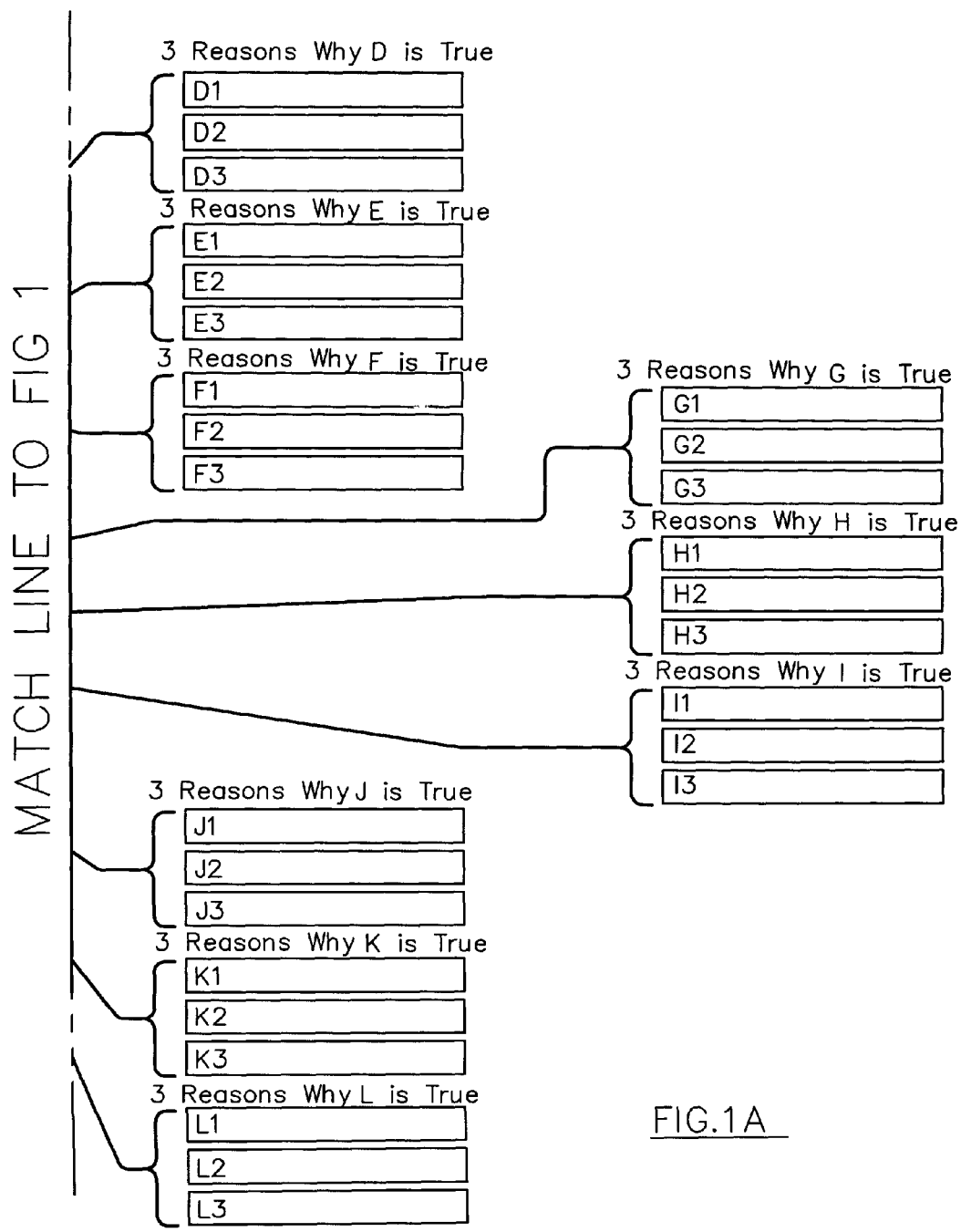
FIG. 1A is a continuation of the flow chart from FIG. 1.

The present invention provides a novel computer based system for composing an essay, a method for composing an essay using the system, and an essay created by the system and method.

The system has at least one computer-readable medium having one or more executable instructions stored thereon, which when executed by at least one processing system, causes the at least one processing system to implement one or more essay generation tools for assisting a user in generating at least one essay. The one or more stored executable instructions comprise a primary instruction prompt to provide a thesis statement. The one or more stored executable instructions further comprise prompts for a secondary instruction to provide at least one paragraph topic sentence wherein said instruction for said paragraph topic sentence contains instruction as to being related to proving said thesis statement. There are provided one or more stored executable instructions further comprising prompts for a conclusory instruction to provide at least one conclusion paragraph topic sentence wherein said instruction for said conclusion paragraph topic sentence contains instruction as to restating said thesis statement and said proofs.

The system and method may be used with any acceptable computer readable medium. In a preferred embodiment, the system is stored on a remote database accessed through the Internet.

The system further comprises an output based on the thesis statements, topic sentence, and conclusion paragraph topic sentence.

The output essay may then be edited as desired and further may be used as a tool to teach a student the portions of an essay that may require editing.

The system may have a user viewable display with at least two distinct regions for displaying user provided input and essay output on a single display. This may be a "split screen" as is commonly known.

Example 1

As shown in the Figure, a preferred embodiment is set forth in this example.
F=FIELD R=REASON UE=USER ENTRY
F1 IS TITLE-UE
F2 IS THESIS STATEMENT-UE
F3 IS R1-UE
F4 IS R2-UE
F5 IS R3-UE
F6 IS CLINCHER STATEMENT-AG
PROGRAM EXPANSION TO 5 PARAGRAPH ESSAY
P=PARAGRAPH AG=AUTOGENERATED TS=TOPIC SENTENCE CS=CLINCHER STATEMENT
F7-F1 is repeated AG
P1
F8-F2-6 is repeated AG
P2
F9 is a combination of F2 and F3 AG
F10 proves F9 UE
F11 proves F9 UE
F12 proves F9 UE
F13 repeats F9 as proven AG P3
F14-18 is built in the same fashion as P2 and is a combination of F2 and F4 AG
P4
F19-24 is built in the same fashion as P2 and is a combination of F2 and F5 AG
P5
F25 IS THE SAME AS P1 AS PROVEN-AG
STANDARD PROMPTS ARE USED ON THE WORKSHEET TO ASSURE THAT THE PROPER INFORMATION IS PUT IN THE PROPER AREA After the shorter (5 paragraph) essay has been generated, to expand to a 17 paragraph essay the following process takes place.
1. The title is repeated
2. The first paragraph is repeated.
3. The second paragraph of the original 5 paragraph essay becomes the first paragraph of a new 5 paragraph essay and then is constructed as shown earlier.
4. The third paragraph of the original 5 paragraph essay becomes the first paragraph of a new 5 paragraph essay and then is constructed as shown earlier.
5. The fourth paragraph of the original 5 paragraph essay becomes the first paragraph of a new 5 paragraph essay and then is constructed as shown earlier.
6. These three new five paragraph essays are kept in order, following the first paragraph of the original 5 paragraph essay (step 2 as shown here).
7. The fifth paragraph of the original 5 paragraph essay is added at the end of the above, thus making 17 paragraphs
In cases where information, as topic sentences, a word of transition is used to make the resultant statement sound more logical i.e. because. In statements of conclusion, as clincher sentences and statements, a word of transition is used to make the resultant statement more logical i.e. therefore, so.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A non-transitory computer-readable medium having one or more executable instructions stored thereon, which when executed by at least one processing system, causes the system to:
    (a) implement one or more essay generation tools for assisting a user in generating at least one essay;
    (b) display prompt to provide input for generating a thesis statement, said thesis statement comprising at least one initial fact to be incorporated into said essay;
    (c) display prompt for a secondary instruction to provide input for generating at least one paragraph topic sentence wherein said instruction for said paragraph topic sentence contains instruction as to being related to proving said thesis statement, said input for generating at least one paragraph topic sentence comprising input of at least one major proof related to said thesis statement;
    (d) display prompts for a conclusory instruction to provide input for generating at least one conclusion paragraph topic sentence wherein said instruction for said conclusion paragraph topic sentence contains instruction as to restating said thesis statement and said proofs,
    (e) wherein said one or more executable instruction automatically generates statements and paragraphs for output based on said one or more stored executable instructions; and conclusory instruction and said output is color coded with separate colors indicating thesis statement, proofs, and conclusory clincher statement, said output is formed based on minimal user input to form an essay and said output includes forming said minimal user input into topic sentences, paragraphs and paragraph transition sentences, and said system automatically generates a conclusory clincher statement and conclusory paragraph that restates the topic sentence and forms a conclusion to the essay.

2. A non-transitory computer-readable medium having one or more executable instructions of claim 1, wherein said computer readable medium is stored on a remote database.

3. A non-transitory computer-readable medium having one or more executable instructions of claim 1, wherein said computer readable medium is accessed through the internet.

4. A non-transitory computer-readable medium having one or more executable instructions of claim 1 further comprising: one or more computer readable instruction to display at least two distinct regions for displaying user provided input and essay output on a single display.

5. A method for composing an expository essay comprising the steps of:
    (a) at least one computer-readable medium having one or more executable instructions stored thereon, which when executed by at least one processing system, causes the at least one processing system to implement one or more essay generation tools for assisting a user in generating at least one essay;
    (b) said one or more stored executable instructions comprising a primary instruction prompt to input for generating provide a thesis statement, said thesis statement comprising at least one initial fact to be incorporated into said essay;
    (c) said one or more stored executable instructions further comprising prompts for a secondary instruction to provide input for generating at least one paragraph topic sentence wherein said instruction for said paragraph topic sentence contains instruction as to being related to proving said thesis statement, said input for generating at least one paragraph topic sentence comprising input of at least one major proof related to said thesis statement;
    (d) said one or more stored executable instructions further comprising prompts for input for generating a conclusory instruction to provide at least one conclusion paragraph topic sentence wherein said instruction for said conclusion paragraph topic sentence contains instruction as to restating said thesis statement and said proofs,
    (e) said system automatically generates statements and paragraphs for output based on said one or more stored executable instructions and conclusory instruction and said automatic output is color coded with separate colors indicating thesis statement, proofs, and conclusory clincher statement, said output is formed based on minimal user input to form an essay and said output includes forming said minimal user input into an introductory thesis statement, paragraphs and paragraph transition sentences, and said system automatically generates a conclusory clincher statement and conclusory paragraph that restates the topic sentence and forms a conclusion to the essay.

* * * * *